UNITED STATES PATENT OFFICE.

FRANCIS J. HUBER, OF CLEVELAND, OHIO.

ARTIFICIAL STONE.

Specification forming part of Letters Patent No. 36,154, dated August 12, 1862.

*To all whom it may concern:*

Be it known that I, FRANCIS JOSEPH HUBER, of Cleveland, in the county of Cuyahoga and State of Ohio, have invented certain new and useful Improvements in Artificial Stone; and I do hereby declare the following is a full, clear, and exact description of the manufacture and use of the same.

My invention consists in the manufacture of an artificial stone the chief components of which are lias lime and clay-slate, and in the modification of said artificial stone so as to make it harder or specific lighter by the addition of certain ingredients, hereinafter to be referred to.

To enable others skilled in the art to make and use my invention, I will proceed to describe its manufacture and use.

The chief components of this artificial stone are lias lime and slate-clay—materials which abound in certain parts of the country, and in some localities in the immediate vicinity of large cities. The lias limestone is burned and slaked with water or diluted sulphuric acid until it is reduced to a powder. The slate-clay is ground fine into a powder, and the materials, when to be used, are mixed in the proportions of one part of lias lime to three parts of slate-clay. They are then moistened to make them sufficiently consistent. The material, being thoroughly mixed, is formed into building-blocks of the desired size by being subjected to the heavy pressure of a powerful brick-machine, and the blocks thus pressed are dried in the open air, and in two or three days become solid and hard, and may be used as building material. They gradually assume the hardness of the best natural building-stone, and are thus highly preferable to the common brick, as they are cheaper and more ornamental in color. By the addition of one thirty-second part of graphite the material may be colored.

The stone made of the above-described composition is to be used for common building purposes as a substitute for bricks. It will stand as heavy a pressure as brick, and is perfectly fire and weather proof. (Specimen No. 5.)

By the addition of three-fourths part of coal-ashes to the above parts I produce a stone which, possessing all the properties of the above stone, is made specifically lighter, and may thus be advantageously used for building the upper stories of buildings or where the material has to be transported some distance. (Specimen No. 11.)

To produce a stone which is to be exposed to direct mechanical action and wear—such, for instance, as stairs—and which consequently ought to possess a higher degree of hardness, I add three parts of pulverized iron cinders and one-half part iron filings and one-eighth part of rye-flour, the latter having the effect of causing a better and quicker action of the lime in this combination and causing the stone to dry in a proportionate very short time. (No. 21.) All these ingredients are moistened with water and reduced to a plastic paste. They are then pressed into blocks by a powerful press and dried in the open air, when they will be ready for use within two or three days.

All the proportions of the several ingredients, as specified in the above description, are used by the weight or pound.

Having thus fully described the nature of my invention, what I claim herein as new, and desire to secure by Letters Patent, is—

An artificial stone composed of lias lime and slate-clay as principal components, when the composition is prepared with or without the additional ingredients, substantially in the manner and for the purpose herein described.

FRANCIS JO. HUBER.

Witnesses:
E. COHEN,
JULIUS H. BROWN.